United States Patent [19]

Bujadoux

[11] 4,388,219
[45] Jun. 14, 1983

[54] CATALYST FOR POLYMERIZING ETHYLENE, COMPRISING COMPOUNDS OF SEVERAL TRANSITION METALS, AND A POLYMERIZATION PROCESS USING SAID CATALYST

[75] Inventor: Karel Bujadoux, Lens, France

[73] Assignee: Societe Chimique des Charbonnages - CdF CHIMIE, Paris, France

[21] Appl. No.: 218,095

[22] Filed: Dec. 19, 1980

[30] Foreign Application Priority Data

Dec. 28, 1979 [FR] France .................. 79 31911

[51] Int. Cl.$^3$ ............................................. B01J 21/02
[52] U.S. Cl. ................... 252/429 C; 252/441; 252/442; 526/114; 526/116
[58] Field of Search .............. 252/441, 442, 429 C; 526/114, 116

[56] References Cited

U.S. PATENT DOCUMENTS

| | | | |
|---|---|---|---|
| 3,223,651 | 12/1965 | Tornqvist et al. | 252/429 C |
| 3,325,424 | 6/1967 | Tornqvist et al. | 252/442 |
| 3,531,420 | 9/1970 | Tornqvist et al. | 252/441 |
| 4,223,117 | 9/1980 | Sano et al. | 252/429 C |

Primary Examiner—Jacqueline V. Howard
Attorney, Agent, or Firm—Finnegan, Henderson, Farabow, Garrett & Dunner

[57] ABSTRACT

A catalyst for polymerizing ethylene, especially at high temperature and high pressure, comprising at least two halogen compounds of transition metals, one of which is a titanium trichloride syncrystallized with aluminum chloride. The catalyst has the formula $$(TiCl_3, \tfrac{1}{3}AlCl_3)(MX_3)_x(MgX_2)_y$$

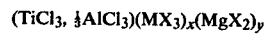

wherein $0.3 \leq x \leq 3$, $0 \leq y \leq 20$, M is a transition metal of Groups V B and VI B of the Periodic System, and X is a halogen. The second transition metal is preferably vanadium, chromium, molybdenum, or tungsten. The catalyst is made by subjecting titanium trichloride syncrystallized with aluminum chloride, the trivalent halide of M, and, optionally, anhydrous magnesium halide to a milling step in which the milling energy is at least equal to three kWh per kg of solid material treated, which results in a binary solid solution structure Ti-M of which the dimension of crystallites is less than or equal to 100 Angstroms.

10 Claims, No Drawings

CATALYST FOR POLYMERIZING ETHYLENE, COMPRISING COMPOUNDS OF SEVERAL TRANSITION METALS, AND A POLYMERIZATION PROCESS USING SAID CATALYST

The present invention concerns catalysts for the polymerisation of ethylene and, more particularly, Ziegler type catalysts, having a solid solution structure.

Numerous Ziegler type catalysts are already known for the polymerisation of ethylene and alpha-olefins. These catalysts generally comprise the catalytic component itself, consisting of at least one halogen compound of a transition metal of Groups IV to V of the Periodic System, and an activator selected from the hydrides and organometallic compounds of the metals of Groups I to III of the Periodic System. The catalytic component comprising the transition metal may be supported by an inert carrier, such as alumina, silica, magnesium oxide, magnesium halides etc.

BACKGROUND OF THE INVENTION

The present invention relates more particularly to Ziegler type catalysts, comprising at least two halogen compounds of transition metals, one of which is a halogen compound of titanium, crystallised together with a halogen compound of a metal of Group III of the Periodic System, and the other of which is a halogen compound of a metal of Groups V b and VI b of the Periodic System, these catalysts being optionally supported by an inert carrier.

The literature gives some examples of Ziegler type catalysts comprising two halogen compounds of two different transition metals: for example, U.S. Pat. No. 3,288,769 describes catalytic components for polymerising ethylene in particular, having the formula $(TiCl_3, VCl_3)_x$, x lying between 0.25 and 4, and permitting a catalytic yield of 15 grams of polymer per milli-atom of titanium and vanadium per hour at 40° C. Similarly, U.S. Pat. No. 3,223,651 describes a catalyst of formula $$y\ TiCl_3, (1-y)\ VCl_3, 0.33\ AlCl_3,$$

y lying between 0.5 and 0.97, capable of producing a synergistic effect for the polymerisation of alpha-olefins at a temperature below 100° C. and at a pressure below 35 bar.

On the other hand, it is known to polymerise ethylene at a pressure of between 300 and 2500 bar, approximately, and at a temperature of between 180° C. and 300° C., approximately. Within the framework of this kind of process, it is desired to improve, on the one hand, the production yield, related to the catalyst used, and, on the other hand, the quality of the polymer produced by modifying the following parameters in particular: density, molecular weight and distribution of molecular weights. It is therefore an object of the present invention to develop catalysts that can be used for polymerising ethylene in conditions of high temperature and high pressure, as defined above, and capable of improving yield and quality of the polymer produced.

SUMMARY OF THE INVENTION AND DESCRIPTION OF PREFERRED EMBODIMENTS

The catalysts for the polymerisation of ethylene according to the invention have the formula $$(TiCl_3, \tfrac{1}{3} AlCl_3)(MX_3)_x(MgX_2)_y,$$

in which $0.3 \leq x \leq 3$, $0 \leq y \leq 20$, M is a transition metal of Groups V b and VI b of the Periodic System and X is a halogen. These catalysts have a binary solid solution structure, Ti-M, which may be characterised by the dimension of its crystallites. It has been found that, from the point of view of the efficiency of these catalysts, this dimension, determined by the radiocrystallographic analysis method (Sherrer's Law) at right angles to the plane (300), should preferably be less than, or equal to, 100 Angstrom units (A.U.). As is understood by their expanded formula, these catalysts may, on occasion—when y>0—be supported by an inert carrier, consisting of an anhydrous magnesium halide. Among the metals M, vanadium and chromium are preferred, but molybdenum and tungsten can also be used. The halogen of the magnesium halide and that of $MX_3$ may be different or the same and are selected from fluorine, chlorine, bromine and iodine. The behaviour of the catalysts according to the invention with respect to the polymerisation of ethylene includes an important aspect, which makes them particularly suitable for use in conditions of high pressure and of high temperature. In fact, it has been observed that, contrary to the catalysts of the prior art already cited, they do not show the synergy phenomenon of the production yield in conditions of low pressure, but only in conditions of high pressure and temperature.

The preferred manufacturing process for the catalysts according to the invention consists in bringing into contact titanium trichloride, crystallised together with aluminum chloride, the trivalent halide of metal M and, optionally, anhydrous magnesium halide for a sufficiently long period of time for the dimension (determined as above) of the crystallites of the solid solution obtained to be below 100 Angstrom units. This can be effectively achieved by submitting the three above-mentioned chlorides to a milling step, in which the milling energy is at least equal to 3 kWh per kg of solid material treated. More precisely, it has been observed that the efficiency of these catalysts in the polymerisation of ethylene is the greater, the higher this milling energy. However, with a view to obtaining optimum efficiency and having regard to operating costs and the need for economising energy, it is generally not necessary for the milling energy to be above 25 kWh, approximately, per kg of solid material treated.

It has been found, moreover, that, with regard to use in conditions of low pressure and moderate temperature, it is desirable to choose catalysts according to the invention, for which $2 \leq y \leq 20$. This particular class of catalysts according to the invention thus finds more varied application, because it can be employed in all processes for the polymerisation of ethylene, whatever their conditions of temperature and pressure.

The present invention also relates to processes for the polymerisation of ethylene, using the catalysts defined above in selected conditions. A first process for the polymerisation of ethylene consists in bringing ethylene, at a pressure of between 300 and 2500 bar, approximately, and at a temperature of between 180° and 300° C. approximately, into the presence of a catalytic system comprising (a) at least one catalyst of formula $(TiCl_3, \tfrac{1}{3}AlCl_3)(MX_3)_x(MgX_2)_y$, in which $0.3 \leq x \leq 3$, $0 \leq y \leq 20$, M is a transition metal of Groups V b and VI b of the Periodic System and X is a halogen, and (b) at least one activator selected from the hydrides and organometallic compounds of metals of Groups I to III of the Periodic System, the atomic ratio of the activator metal to the sum Ti+M lying between 0.1 and 10 and the mean residence time of the catalytic system in the polymerisation reactor lying between 2 and 100 seconds. This residence time depends on the temperature in the reactor, in the sense that it is the longer, the lower the temperature. This first process may bring into operation, especially when the temperature and/or the pressure of polymerisation are not very high, the pressure of an inert hydrocarbon, having preferably less than 5 carbon atoms, such as, for example, propane or butane.

A second process for the polymerisation of ethylene according to the invention consists in bringing ethylene, at a pressure of between 1 and 200 bar, approximately, and at a temperature of between 20° and 200° C., into solution or suspension in an inert liquid hydrocarbon having at least 6 carbon atoms, preferably selected from among saturated aliphatic or cycloaliphatic compounds and aromatic compounds, in the presence of a catalytic system comprising (a) at least one catalyst of formula $(TiCl_3, \frac{1}{3}AlCl_3)(MX_3)_x(MgX_2)_y$, in which $0.3 \leq x \leq 3$, $2 \leq y \leq 20$, M is a transition metal of Groups V b and VI b of the Periodic System and X is a halogen, and (b) at least one activator selected from among the hydrides and organometallic compounds of metals of Groups I to III of the Periodic System, the atomic ratio of the activator metal to the sum Ti+M lying between 1 and 1000. In this type of process, the mean residence time of the catalytic system in the polymerisation reactor is, generally, several minutes and can reach some hours.

If, in the high pressure process, an autoclave reactor or tubular reactor, having several reaction zones, is employed, it may be advantageous, with a view to producing certain polymer grades, to adopt a particular arrangement for the polymerisation equipment, such as, for example, one of those described in U.S. Pat. Nos. 4,105,842 and 4,168,356. Frequently, it will be useful for controlling the melt index of the polymer, especially of polyethylene, to effect polymerisation in the presence of a chain transfer agent, such as hydrogen. In the high pressure process, this agent will be used at the rate of from 0.04 to 2% by volume, related to ethylene.

Concerning the polymerisation or copolymerisation of ethylene, the process according to the invention permits the production of a whole range of polymers, the density of which lies between 0.905 and 0.960 g/cm$^3$ and the melt index of which lies between 0.1 and 100 dg/min, approximately. Polymers of relatively low density, for example of between 0.905 and 0.935 g/cm$^3$, are obtained by copolymerising ethylene with an alpha-olefin having from 3 to 8 carbon atoms, for example propene at the rate of from 15 to 35% by weight, or butene-1 at the rate of 15 to 60% by weight.

The processes according to the invention make it possible to improve, on the one hand, the production yield in relation to the catalyst employed and, on the other hand, the quality of the polymer produced, by modifying the parameters of density, molecular weight and distribution of molecular weights. Other advantages of the invention will become clear on reading the following examples, given by way of illustration and without implying any limitation.

EXAMPLES 1 TO 3

There are introduced in a discontinuous ball-mill, on the one hand, titanium trichloride, crystallised together with aluminium chloride,—$TiCl_3, \frac{1}{3}AlCl_3$,—and, on the other hand, chromium trichloride $CrCl_3$, (and, for Example 3, vanadium trichloride $VCl_3$), in such quantities that the atomic ratios, Cr/Ti and V/Ti, are equal to the values indicated in Table I. After two hours of joint milling, the catalyst obtained is dispersed in methyl cyclohexane and activated by dimetylethyldiethylsiloxalane in such quantity that the atomic ratio, Al/Ti, is equal to 6. Polymerisation of ethylene is then effected,—optionally in the presence of propene comonomer in the proportion by weight, indicated in Table I,—in a continuous process at a pressure of 600 bar in an autoclave reactor, having a volume of 0.6 liter and maintained at a temperature of 230° C., by injecting the catalyst dispersion thus prepared in such a way that the mean residence time of the catalyst in the reactor is equal to 30 seconds, approximately. Hydrogen is injected into the reactor in the quantity indicated in Table I, so as to control the melt index of the polymer produced. Apart from the working conditions, Table I below indicates the catalytic yield, CY, expressed in kilograms of polyethylene per milliatom of titanium, the melt index Mi, measured according to ASTM Standard D 1238 and expressed in dg/min, and the density $\rho$, expressed in g/cm$^3$.

TABLE I

| Example | Cr/Ti | V/Ti | % H$_2$ | % C$_3$H$_6$ | CY | Mi | $\rho$ |
|---|---|---|---|---|---|---|---|
| 1 | 0.33 | 0 | 0.5 | 0 | 3.0 | 3.6 | 0.948 |
| 2 | 1 | 0 | 0.25 | 29.5 | 1.1 | 12.8 | 0.932 |
| 3 | 0.33 | 0.67 | 0.25 | 29.5 | 3.1 | 3.2 | 0.931 |

EXAMPLES 4 AND 5

There are introduced in a discontinuous ball-mill, on the one hand, titanium trichloride, crystallised together with aluminum chloride, $TiCl_3, \frac{1}{3}AlCl_3$, and, on the other hand, vanadium trichloride, $VCl_3$, in such quantities that the atomic ratio, V/Ti, is equal to the value indicated in Table II. After two hours of joint milling, the catalyst obtained is dispersed in methyl cyclohexane and activated by dimethylethyldiethylsiloxalane in such quantity that the atomic ratio, Al/Ti, is equal to 6. Ethylene is then polymerised in a continuous process at a pressure of 1200 bar in a cylindrical autoclave reactor, having a volume of 3 liters and divided, by means of baffle-plates, into three identical zones, the first of which is maintained at a temperature of 220° C. and the third of which is maintained at a temperature of 260° C. The temperature T$_2$ of the second zone varies with the examples and is indicated in Table II. The catalyst dispersion is injected into the reactor in such a way that the mean residence time of the catalyst in the reactor is about 30 seconds. Hydrogen is injected into the reactor in the quantity indicated in Table II, so as to control the melt index of the polyethylene produced. Apart from the working conditions, Table II below indicates the catalytic yield CY, expressed in kg of polymer per milliatom of titanium and vanadium, the melt index MI, the density $\rho$ as well as the number average molecular weight Mn and the percentage B of molecular weights below 5,000, determined by gel chromatography.

EXAMPLES 6 AND 7

The identical procedure as in the experiments of Examples 4 and 5 is followed, except that the catalyst, introduced into the reactor, only consists of titanium trichloride, $TiCl_3, \frac{1}{3}AlCl_3$, for Example 6 and only of vanadium trichloride, $VCl_3$, for Example 7. The different working conditions and the polymerisation results are recorded in Table II below.

TABLE II

| Example | 4 | 5 | 6 | 7 |
|---|---|---|---|---|
| V/Ti | 1 | 2 | 0 | |
| $T_2$ °C. | 170 | 220 | 245 | 240 |
| % $H_2$ | 2.1 | 2.3 | 1.7 | 1.0 |
| CY | 10.1 | 7.7 | 3.4 | 3.0 |
| MI | 7.3 | 7.2 | 6.2 | 6.9 |
| ρ | 0.958 | 0.958 | 0.954 | 0.956 |
| Mn | 17 000 | 17 500 | 11 500 | 9 000 |
| B | 5.9 | 5.8 | 10.0 | 12.8 |

Thus it is clearly shown by a comparison of Examples 4 and 5, on the one hand, and 6 and 7, on the other, that the catalysts according to the invention make it possible, for polymers of equivalent melt indices, to increase considerably the catalytic yield as well as the molecular weight, while reducing the content of low molecular weight and raising the density.

EXAMPLES 8 TO 11

There are introduced in a discontinuous ball-mill, the specific power of which is 0.8 kW per kilogram of material treated, equimolecular quantities of $TiCl_3$, $\frac{1}{3}AlCl_3$ and of $VCl_3$. After a joint milling run of duration t, expressed in hours, the catalyst obtained is submitted to radio-crystallographic analysis, which enables the dimension c of the crystallites in the plane (3 0 0) to be determined according to Scherrer's Law. It is observed that the catalyst has a solid solution structure. After this analysis, the catalyst is dispersed in methyl cyclohexane and activated by dimethylethyldiethylsiloxalane in such a quantity that the atomic ratio, Al/(Ti+V), is equal to 6.

Ethylene is then polymerised in a continuous process by the same working procedure as in Example 4 and 5, the temperature $T_2$ being maintained constant at 230° C. Table III below indicates, apart from the milling time for the catalyst, the yield CY, expressed as in the trials 4 to 7, the density ρ, the molecular weight Mn, the percentage B and the dimension c, expressed in Angstrom units.

TABLE III

| Example | t | CY | ρ | Mn | B | c |
|---|---|---|---|---|---|---|
| 8 | 0 | 2.0 | 0.954 | 10 000 | 10.9 | 2 000 |
| 9 | 4 | 7.1 | 0.958 | 15 000 | 7.3 | 100 |
| 10 | 8 | 9.8 | 0.956 | 16 500 | 5.9 | 80 |
| 11 | 15 | 12.5 | 0.954 | 22 500 | 4.2 | 60 |

EXAMPLE 12

The catalyst, obtained in accordance with Example 9, is dispersed in methyl cyclohexane and then activated by monofluorodiethylaluminium in such a quantity that the atomic ratio, Al/(Ti+V), is equal to 6. Ethylene is then polymerised in a continuous process at a pressure of 600 bar in the presence of 0.5 mole percent of hydrogen in a cylindrical autoclave reactor, having a volume of 0.6 liter and maintained at a temperature of 230° C. The catalyst dispersion is injected into the reactor in such a way that the mean residence time of the catalyst in the reactor is of about 30 seconds. A polyethylene, having a melt index equal to 8.2 dg/min, is then obtained with a catalytic yield of 6.1 kg of polymer per milli-atom of titanium and vanadium.

EXAMPLES 13 AND 14

Milling energy of 4 kWh per kg of material treated is applied in a discontinuous ball-mill to a mixture of $TiCl_3$, $\frac{1}{3}AlCl_3$ and $VCl_3$ in the molecular proportions indicated in Table IV. The catalyst obtained, dispersed in methyl cyclohexane and activated by dimethylethyldiethylsiloxalane at an atomic ratio, Al/(Ti+V)=6, is used for polymerising ethylene in a continuous operation at a pressure of 1 200 bar in a cylindrical autoclave reactor, having a volume of 3 liters and maintained at a temperature of 240° C., the mean residence time of the catalyst in this reactor being about 30 seconds. Table IV below indicates, apart from the atomic ratio V/Ti in the catalyst, the polymerisation results, measured as for the preceding examples.

TABLE IV

| Example | V/Ti | CY | ρ | Mn | B |
|---|---|---|---|---|---|
| 13 | 0.5 | 6.2 | 0.959 | 22 000 | 3.9 |
| 14 | 3 | 6.0 | 0.959 | 21 500 | 4.0 |

EXAMPLES 15 TO 17

Milling energy E, expressed in kWh per kg of material treated, is applied in a discontinuous ball-mill to a mixture of $TiCl_3$, $\frac{1}{3}AlCl_3$, of $VCl_3$ and of $MgCl_2$ in the molecular proportions indicated in Table V below. The catalyst obtained, dispersed in a $C_{11}$-$C_{12}$ hydrocarbon cut and activated by dimethylethyldiethylsiloxalane at an atomic ratio, Al/(Ti+V)=100, is used for polymerising ethylene in solution in the above-mentioned $C_{11}$-$C_{12}$ cut in a steel autoclave reactor, having a capacity of 1 liter at a temperature of 200° C. and at a pressure of 6 bar for the duration of one minute. The solution is subsequently recovered and the polymer separated by filtration after cooling.

Table V below indicates, apart from the working conditions, the catalytic yield CY, expressed in grams of polymer per gram of titanium per minute and per atmosphere.

TABLE V

| Example | V/Ti | Mg/Ti | E | CY |
|---|---|---|---|---|
| 15 | 1 | 6 | 4.0 | 606 |
| 16 | 1 | 12 | 6.1 | 678 |
| 17 | 2 | 12 | 3.1 | 474 |

EXAMPLES 18 TO 20

The catalyst, obtained in accordance with Example 15, is dispersed in methyl cyclohexane and then activated by dimethylethyldiethylsiloxalane, (Examples 18 and 19), or by an equimolecular mixture of monochlorodiethylaluminium and trioctylaluminium, (Example 20) at an atomic ratio, Al/(Ti+V), equal to 6. Ethylene is then polymerised in the presence of this catalytic system:

in a cylindrical autoclave reactor, having a volume of 0.6 liter and maintained at a temperature of 230° C. and at a pressure of 600 bar, in so far as Example 18 is concerned;

in a cylindrical autoclave reactor, having a volume of 3 liters and maintained at a temperature of 240° C. and at a pressure of 1 200 bar, in so far as Examples 19 and 20 are concerned;

the mean residence time of the catalyst in the reactor being about 30 seconds. Table VI below indicates the polymerisation results and particularly the yield CY, the density ρ, the molecular weight Mn and the percentage B.

EXAMPLE 21

The catalyst, obtained in accordance with Example 17, dispersed in methyl cyclohexane and then activated by dimethylethyldiethylsiloxalane at an atomic ratio, Al/(Ti+V), equal to 6, is used for polymerising ethylene in a cylindrical autoclave reactor, having a volume of 3 liters and maintained at a temperature of 240° C. and at a pressure of 1 200 bar, the mean residence time of the catalyst in the reactor being about 30 seconds. Table VI below indicates the results of this polymerisation.

TABLE VI

| Example | CY | ρ | Mn | B |
|---|---|---|---|---|
| 18 | 9.5 | 0.958 | 12 500 | 5.4 |
| 19 | 6.5 | 0.957 | 29 500 | 2.4 |
| 20 | 7.4 | 0.956 | 18 500 | 4.5 |
| 21 | 6.5 | 0.962 | 24 000 | 3.2 |

EXAMPLE 22

The catalyst, obtained in accordance with Example 16, dispersed in methyl cyclohexane and activated by dimethylethyldiethyl, siloxalane at an atomic ratio, Al/(Ti+V), equal to 6, is used for copolymerising ethylene and propene, (30% by weight), in a cylindrical autoclave reactor, having a volume of 0.6 liter and maintained at a pressure of 600 bar and at a temperature of 230° C., in the presence of 0.25 mole percent of hydrogen. A copolymer, having a density of 0.939 g/cm³ and a melt index of 7.2 dg/min, is produced with a catalytic yield of 4.1 kg per milli-atom of titanium and vanadium.

What we claim is:

1. A catalyst for polymerizing ethylene comprising at least two halogen compounds of transition metals, one of which is a titanium trichloride syncrystallized with aluminium chloride, having the formula:

$(TiCl_3, \frac{1}{3}AlCl_3)(MX_3)_x(MgX_2)_y$ wherein $0.3 \leq x \leq 3$, $0 \leq y \leq 20$, M is a transition metal of group V B and VI B of thhe Periodic system and X is a halogen.

2. A catalyst according to claim 1, having a binary solid solutioh structure Ti-M of which the dimension of crystallites is less than or equal to 100 Angstrom units.

3. A catalyst according to claim 1, wherein $2 \leq y \leq 20$.

4. A process for manufacturing a catalyst according to claim 1, 2, or 3, comprising bringing into contact titanium trichloride crystallized together with aluminum chloride, the trivalent halide of metal M and, optionally, anhydrous magnesium halide, and subjecting said three halides to a milling step in which the milling energy is at least equal to 3 kWh per kg of solid material treated.

5. A process according to claim 4, wherein the milling energy is not above 25 kWh per kg of solid material treated.

6. A catalyst according to claim 1, wherein M is selected from the group consisting of vanadium, chromium, molybdenum, and tungsten.

7. A catalyst according to claim 6, wherein M is vanadium.

8. A catalyst according to claim 6, wherein M is chromium.

9. A catalyst according to claim 1, wherein x is more than 1.0.

10. A catalyst for polymerizing ethylene comprising at least two halogen compounds of transition metals, one of which is a titanium trichloride syncrystallized with aluminum chloride, having the formula:

$(TiCl_3, \frac{1}{3}AlCl_3)(MX_3)_x(MgX_2)_y$ wherein $0.3 \leq x \leq 3$, $0 \leq y \leq 20$, M is a transition metal of Groups V B and VI B of the Periodic System and X is a halogen, said catalyst being made by a process comprising bringing into contact titanium trichloride crystallized together with aluminum chloride, the trivalent halide of metal M and, optionally, anhydrous magnesium halide, and subjecting said three halides to a milling step in which the milling energy is at least equal to 3 kWh per kg of solid material treated.

* * * * *

UNITED STATES PATENT AND TRADEMARK OFFICE
CERTIFICATE OF CORRECTION

PATENT NO. : 4,388,219
DATED : June 14, 1983
INVENTOR(S) : KAREL BUJADOUX

It is certified that error appears in the above—identified patent and that said Letters Patent is hereby corrected as shown below:

IN THE CLAIMS:

Claim 1, line 7, "group V B and VI B of thhe" should read --Groups V B and VI B of the--.

Claim 2, line 2, "solutioh" should read --solution--.

Signed and Sealed this

Thirtieth Day of August 1983

[SEAL]

Attest:

GERALD J. MOSSINGHOFF

Attesting Officer

Commissioner of Patents and Trademarks